United States Patent
Correa et al.

(10) Patent No.: US 6,241,398 B1
(45) Date of Patent: Jun. 5, 2001

(54) ELECTROMAGNETIC COMPLIANCE AND ELECTROSTATIC DISCHARGE SHIELD ASSEMBLY FOR AN OPTICAL FIBER CONNECTOR

(75) Inventors: Everado Correa, Elizabeth; Liang Hwang, Old Bridge, both of NJ (US); Michael S. Ruduski, Endicott, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/432,744

(22) Filed: Nov. 2, 1999

(51) Int. Cl.[7] ....................................................... G02B 6/38
(52) U.S. Cl. ................................ 385/75; 385/53; 385/55; 385/56
(58) Field of Search .................................. 385/75, 69, 81, 385/92, 87, 88, 55, 56, 57, 137, 138, 139, 147; 439/79, 607; 174/35 GC, 35 R, 36

(56) References Cited

U.S. PATENT DOCUMENTS 5,082,338 * 1/1992 Hodge ..................................... 385/81

* cited by examiner

*Primary Examiner*—Phan T. H. Palmer
(74) *Attorney, Agent, or Firm*—David L. Davis

(57) ABSTRACT

A conductive tubular member surrounding an optical fiber and its connector termination. When the fiber connector termination engages a complementary connector extending through an opening in a conductive faceplate of an electronics system, the tubular member engages the securement nut holding the connector to the faceplate to function as a waveguide which attenuates radiation leaking from non-conductive gaps in the faceplate and connector. In addition, the tubular member functions as a ground path for electrostatic discharges.

11 Claims, 2 Drawing Sheets

ELECTROMAGNETIC COMPLIANCE AND ELECTROSTATIC DISCHARGE SHIELD ASSEMBLY FOR AN OPTICAL FIBER CONNECTOR

BACKGROUND OF THE INVENTION

This invention relates to the provision of an electromagnetic compliance and electrostatic discharge shield assembly for an optical fiber connector extending through an opening in a conductive faceplate.

Modern electronic systems equipment, such as for telecommunications purposes, often includes various subassemblies packed closely together and interconnected by cabling. Such systems operate at relatively high frequencies and therefore electromagnetic radiation and interference is often a problem. To obviate this problem, the cables often include a conductive outer jacket which provides shielding and grounding for the cable. In addition, the subassemblies are often encased within a conductive housing. While such a housing is somewhat effective, electromagnetic radiation can still pass through gaps in the housing. At the increasingly high frequencies utilized in today's equipment, even a small gap permits unwanted electromagnetic radiation to pass therethrough. In addition, an electrostatic discharge from a person approaching the housing can jump through the gap and damage sensitive electronic components within the housing. One source of such a small gap is an optical fiber connector extending through an opening in a faceplate. The optical fiber itself is non-conductive, as are portions of the connector. Accordingly, there exists a need to provide an effective shielding and grounding assembly to eliminate the effects of such gaps.

SUMMARY OF THE INVENTION

According to the present invention, there is provided an electromagnetic compliance and electrostatic discharge shield assembly for an optical fiber connector extending through an opening in the faceplate. The assembly comprises a conductive nut adapted to secure the connector to the faceplate. A conductive elongated tubular member is provided which is adapted to surround an optical fiber connected to the connector and to engage the exterior of the nut at one end of the tubular member.

In accordance with an aspect of this invention, the tubular member tapers inwardly toward its end remote from the one end.

In accordance with another aspect of this invention, the nut has an engagement feature on its exterior circumferential surface and the tubular member has at the one end an interior engagement feature complemental to the exterior engagement feature of the nut.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
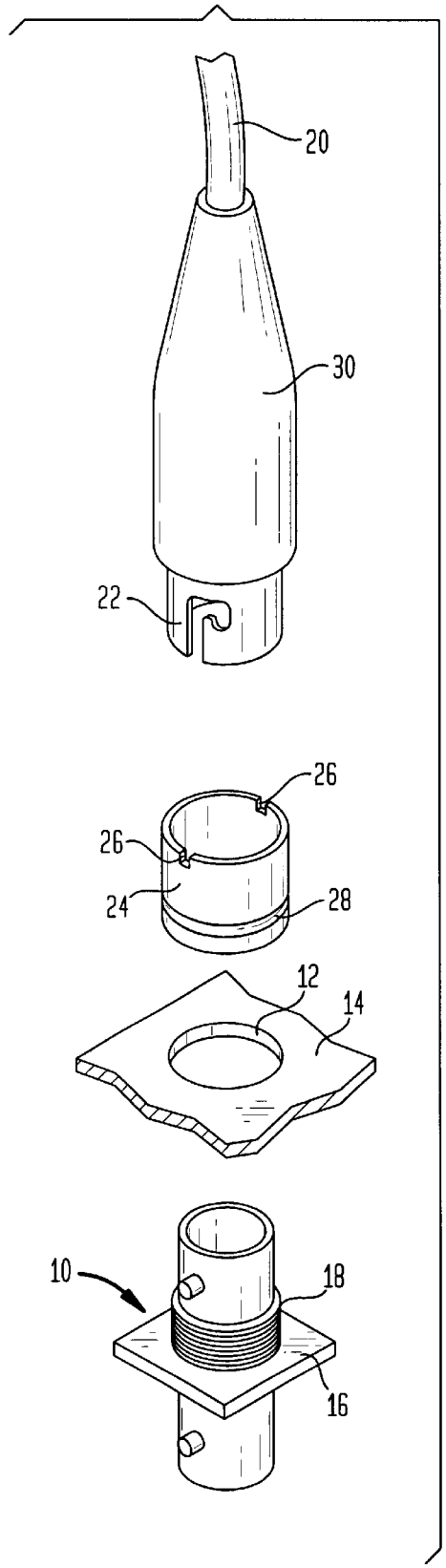
FIG. 1 is an exploded perspective view of a first embodiment of an assembly constructed in accordance with the present invention.

Referring now to the drawings, an optical fiber connector 10 is adapted to have an end extending through an opening 12 in a conductive faceplate 14 of an electronics system. As is conventional, the connector 10 includes a flange 16 and external threads 18. The threads 18 are adapted to be engaged by a nut on the other side of the faceplate 14 from the flange 16 so as to securely hold the connector 10 to the faceplate 14. An optical fiber 20 is terminated by a connector 22 which is adapted to engage the connector 10. The foregoing is conventional and well understood by one skilled in the art.

It is known that the amount of leakage through a gap is a function of the size of the gap and the length of a conductive waveguide in communication with the gap. The longer the length, the less radiation from a gap of fixed size. It is also known that the ratio of length to width of a waveguide in a range from about 6:1 to 10:1 provides 180 dB of effective loss. Accordingly, the present invention increases the "length" of the gap.

Figure 2:
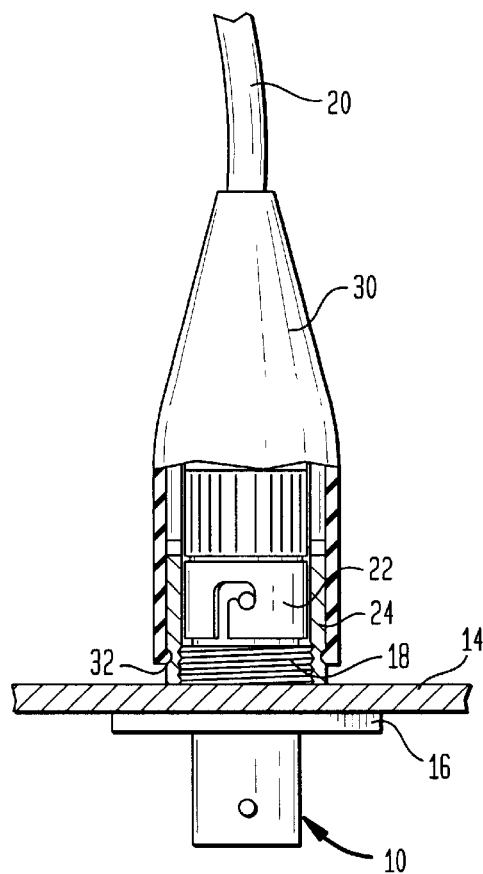
FIG. 2 is a partially cut away side view of the assembled embodiment of FIG. 1.

According to the present invention, a conductive nut 24 is provided to secure the connector 10 to the faceplate 14. The nut 24 has internal threads for engaging the threads 18 of the connector 10 and is provided with a pair of diametrically opposed slots 26 so that it can be tightened on the threads 18 by using a screwdriver. The interior dimension of the nut 24 is sufficiently large that the connector 22 can fit inside the nut 24 after the nut 24 is used to secure the connector 10 to the faceplate 14, as shown in FIG. 2. The nut 24 is preferably provided with an engagement feature on its exterior circumferential surface. Illustratively, the engagement feature is a circumferential exterior groove 28.

To increase the gap length, there is provided a conductive elongated tubular member 30. In the embodiment shown in FIGS. 1 and 2, the tubular member 30 is formed of an electrically conductive elastomer. The tubular member 30 has at one end an interior engagement feature complemental to the exterior engagement feature of the nut 24. As best seen in FIG. 2, this engagement feature is an inwardly directed protrusion, illustratively a circumferential interior rib 32, which snaps into the groove 28. Illustratively, the tubular member 30 is tapered inwardly toward its other end so as to closely surround the fiber 20. This further serves to decrease the effective gap. In addition to providing shielding against radiation, the aforedescribed assembly also provides shielding for electrostatic discharge by providing a conductive path from the tubular member 30 through the nut 24 to the faceplate 14.

In use, the tubular member 30 is placed on the fiber 20 prior to the fiber 20 being terminated by the connector 22. After the connector 22 terminates the fiber 20, the connector 22 is attached to the connector 10 within the interior of the nut 24 and the tubular member 30 is moved along the fiber 20 until the rib 32 engages the groove 28.

Figure 3:
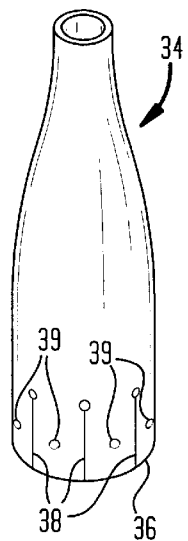
FIG. 3 is a perspective view of a second embodiment of a tubular member according to the present invention.

FIG. 3 illustrates an embodiment of a tubular member 34 which is formed of drawn sheet metal. In this embodiment, the end 36 of the tubular member 34 is designed to snugly fit over the nut 24 and the end 36 is formed with longitudinal slits 38 which provide resiliency. To engage the groove 28, the tubular member 34 is illustratively formed with a plurality of inwardly directed bumps 39 located along a circle lying in a plane orthogonal to the longitudinal axis of the tubular member 34.

Figure 4:
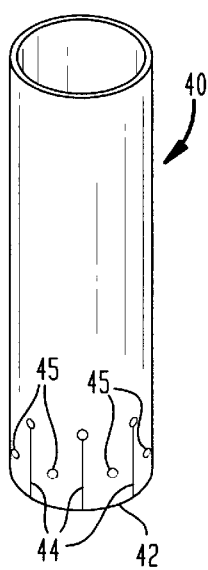
FIG. 4 is a perspective view of a third embodiment of a tubular member according to the present invention.

FIG. 4 illustrates an embodiment of the tubular member 40 which is a straight sheet metal tube. Like the embodiment shown in FIG. 3, the end 42 fits snugly over the nut 24, is formed with longitudinal slits 44 which provide resiliency, and includes inwardly directed bumps 45.

As an alternative to the bumps described above, the tubular members 34, 40 can have their ends 36, 42, respectively, folded inwardly to form an interior rib which engages the groove 28.

Figure 5A:
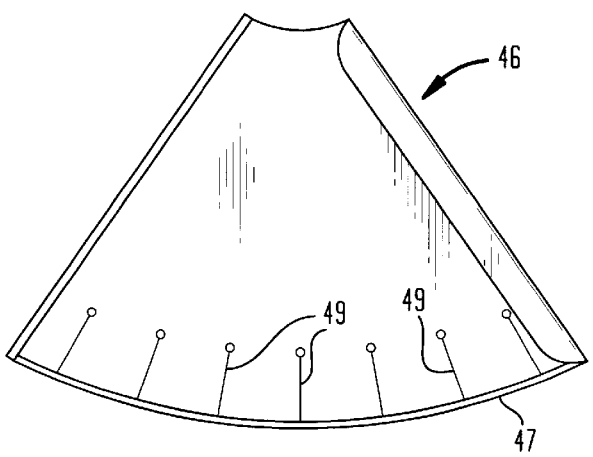
FIG. 5A shows sheet metal for forming a fourth embodiment of the tubular member according to the present invention prior to its final assembly and FIG. 5B is a perspective view, partially cut away, of the fourth embodiment of the tubular member according to the present invention.
Figure 5B:
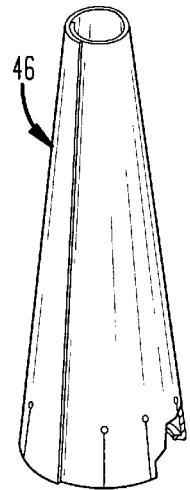

FIGS. 5A and 5B illustrate an embodiment of a tubular member 46 formed from an annular segment of sheet metal which is then formed into a frusto-conical shape. The sheet making up the tubular member 46 may be folded inwardly at its larger radial periphery 47 to form a rib which engages the groove 28 of the nut 24. The tubular member 46 further has a plurality of radial slits 49 originating at its larger radial periphery 47 to provide resiliency.

Figure 6:
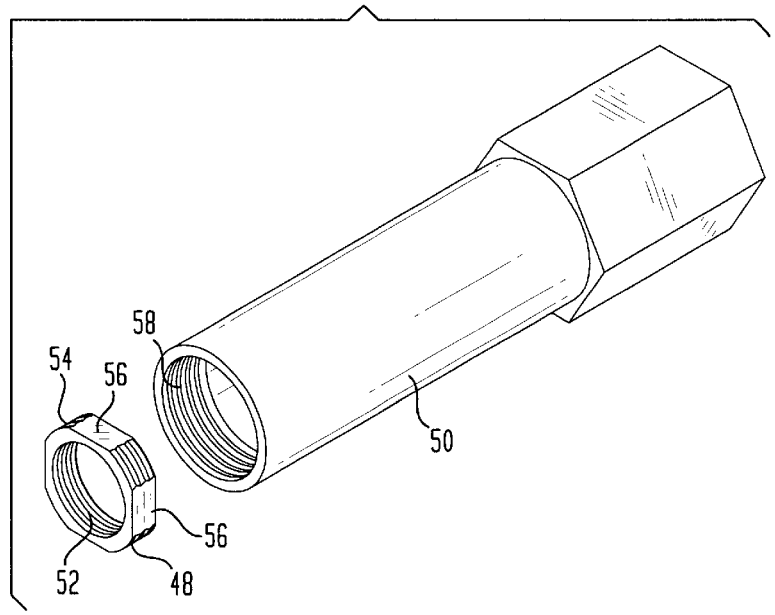
FIG. 6 is an exploded perspective view of a fifth embodiment of a nut and complementary tubular member according to the present invention.

FIG. 6 shows a shielding assembly having a nut 48 and a conductive tubular member 50. The nut 48 has interior threads 52 for engaging the threads 18 of the connector 10. The nut 48 further has exterior threads 54 and has at least two diametrically opposed exterior flatted portions 56 which are grippable by a wrench for installation on the connector 10. The tubular member 50 has interior threads 58 for engaging the threads 54 of the nut 48. The other end of the tubular member 50 is hexagonally shaped so that it may be gripped by a wrench for installation.

For each of the tubular members 30, 34, 40, 46, 50, the ratio of its length to its internal diameter at the end adjacent the faceplate 14 is preferably in the range from about 6:1 to about 10:1.

Accordingly, there have been disclosed embodiments an improved electromagnetic compliance and electrostatic discharge shield assembly for an optical fiber connector. While various illustrative embodiments of the present invention have been disclosed herein, it is understood that various adaptations and modifications to the disclosed embodiments are possible and it is intended that this invention be limited only by the scope of the appended claims.

What is claimed is:

1. An electromagnetic compliance and electrostatic discharge shield assembly for an optical fiber connector extending through an opening in a faceplate, the assembly comprising:
   a conductive nut adapted to secure the connector to the faceplate, wherein the nut has an engagement feature on its exterior circumferential surface; and
   a conductive elongated tubular member adapted to surround an optical fiber connected to the connector and to engage the exterior of the nut at one end of the tubular member, wherein the tubular member has at said one end an interior engagement feature complemental to the exterior engagement feature of the nut.

2. The assembly according to claim 1 wherein the tubular member tapers inwardly toward its end remote from said one end.

3. The assembly according to claim 1 wherein the ratio of the length of the tubular member to the diameter of the tubular member at said one end is from about 6:1 to about 10:1.

4. The assembly according to claim 1 wherein the engagement features of the nut and of the tubular member comprise complementary threads.

5. The assembly according to claim 4 wherein the nut has at least two diametrically opposed exterior flatted portions.

6. The assembly according to claim 1 wherein the engagement feature of the nut comprises a circumferential exterior groove and the engagement feature of the tubular member comprises an inwardly directed protrusion.

7. The assembly according to claim 6 wherein the tubular member is formed of an electrically conductive elastomer.

8. The assembly according to claim 6 wherein the tubular member is a sheet metal tube having a plurality of longitudinal slits originating at its one end.

9. The assembly according to claim 6 wherein the tubular member is formed from an annular segment of sheet metal having a plurality of radial slits originating at its larger radial periphery.

10. The assembly according to claim 6 wherein the engagement feature of the tubular member comprises a circumferential interior rib.

11. The assembly according to claim 6 wherein the engagement feature of the tubular member comprises a plurality of bumps located along a circle lying in a plane orthogonal to a longitudinal axis of the tubular member.

* * * * *